Feb. 11, 1936.  A. F. NASH  2,030,529
SAFETY DEVICE FOR CRANES AND THE LIKE
Filed Dec. 22, 1931    8 Sheets-Sheet 1
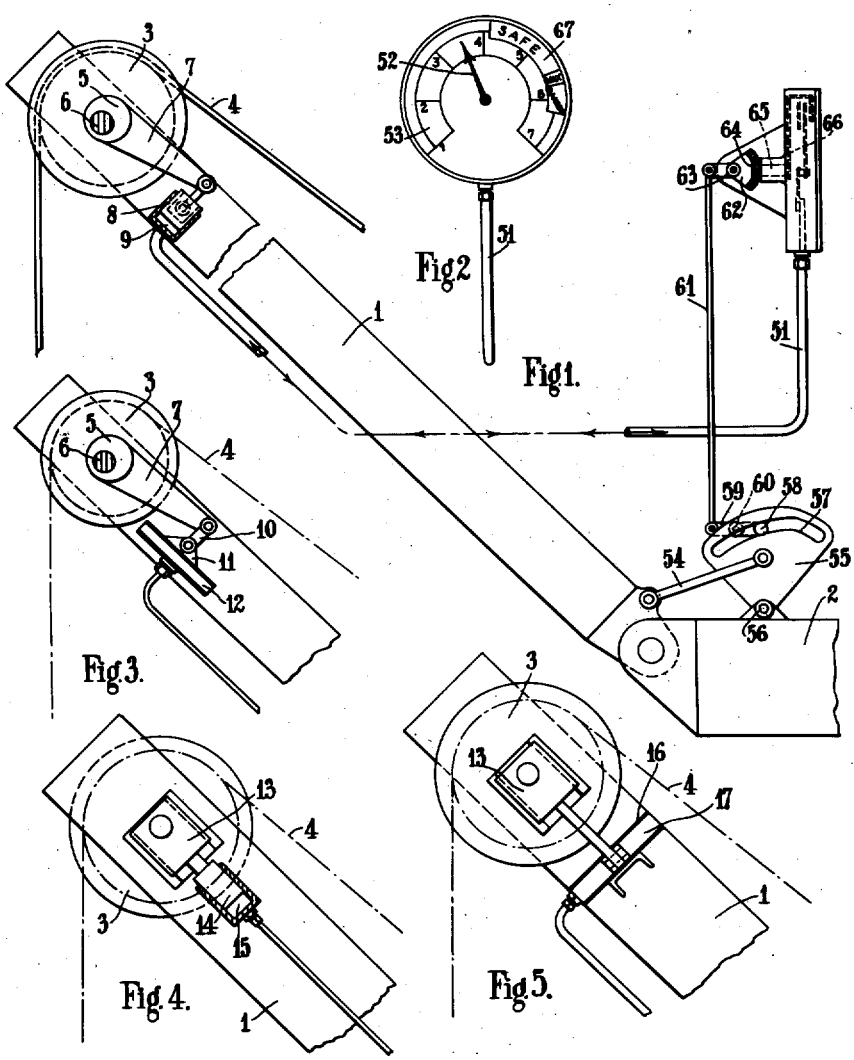

Feb. 11, 1936.  A. F. NASH  2,030,529
SAFETY DEVICE FOR CRANES AND THE LIKE
Filed Dec. 22, 1931  8 Sheets-Sheet 2
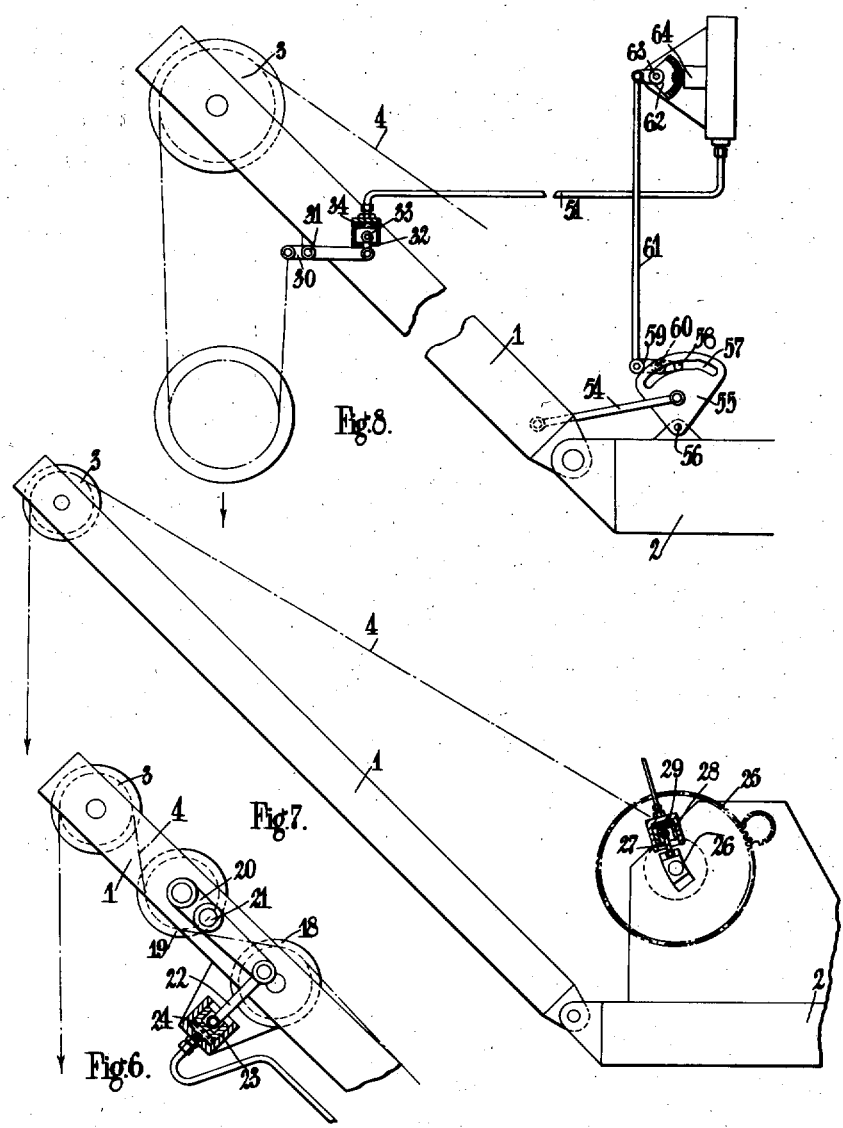

Feb. 11, 1936.　　　　　A. F. NASH　　　　　2,030,529
SAFETY DEVICE FOR CRANES AND THE LIKE
Filed Dec. 22, 1931　　　8 Sheets-Sheet 3
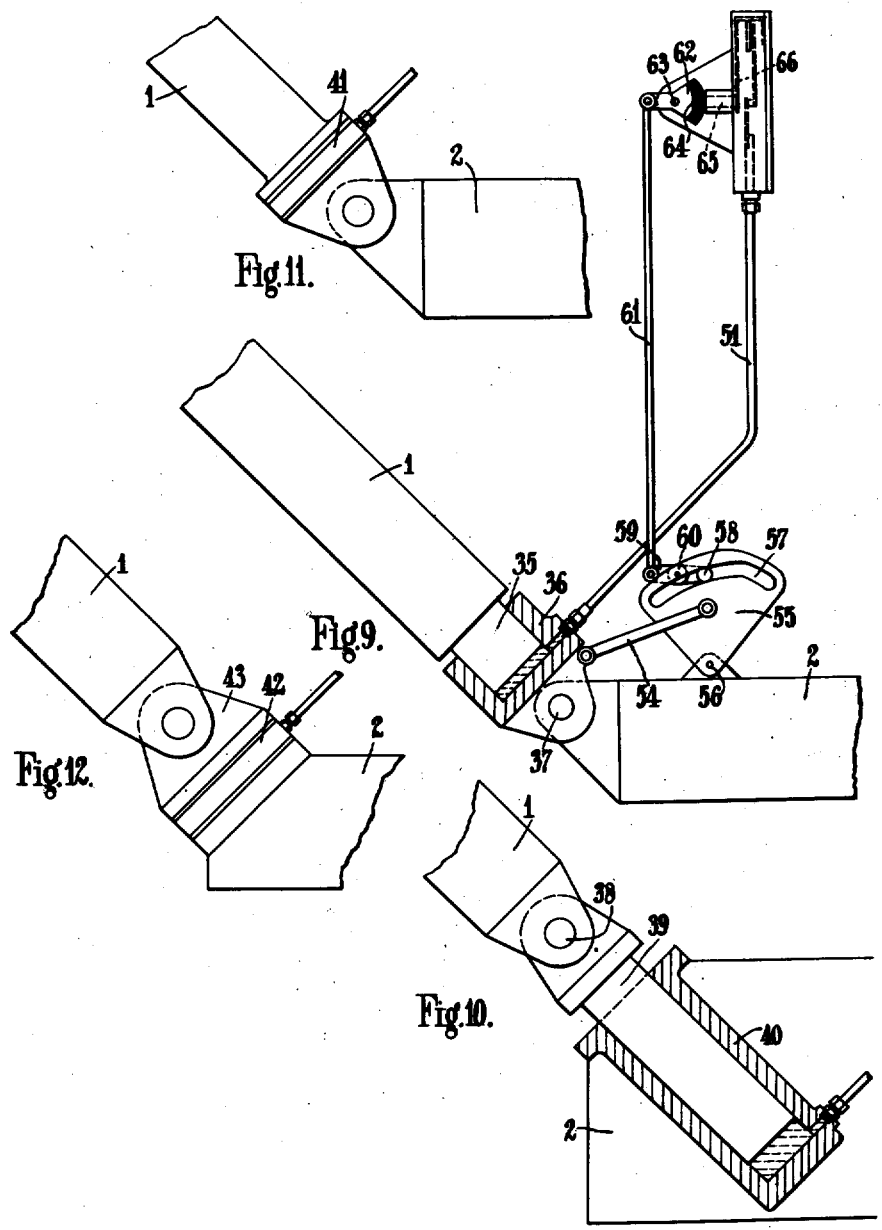

Feb. 11, 1936.　　　　A. F. NASH　　　　2,030,529
SAFETY DEVICE FOR CRANES AND THE LIKE
Filed Dec. 22, 1931　　　8 Sheets-Sheet 5
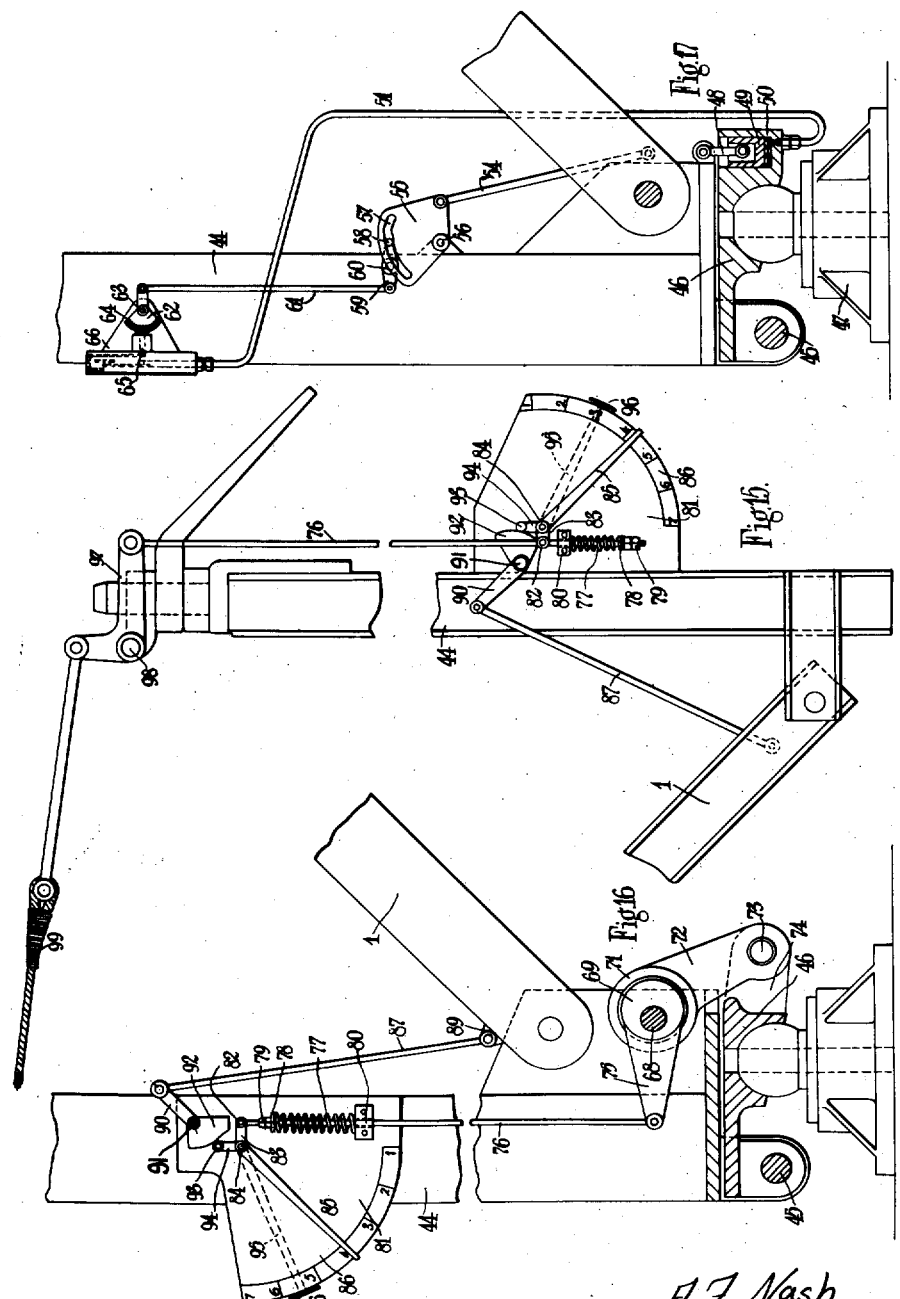
A. F. Nash
INVENTOR
By: Marks & Clerk
Attys.

Feb. 11, 1936.   A. F. NASH   2,030,529
SAFETY DEVICE FOR CRANES AND THE LIKE
Filed Dec. 22, 1931   8 Sheets-Sheet 6

A. F. Nash
INVENTOR

By: Marks & Clerk
Attys.

Feb. 11, 1936.  A. F. NASH  2,030,529
SAFETY DEVICE FOR CRANES AND THE LIKE
Filed Dec. 22, 1931  8 Sheets-Sheet 7
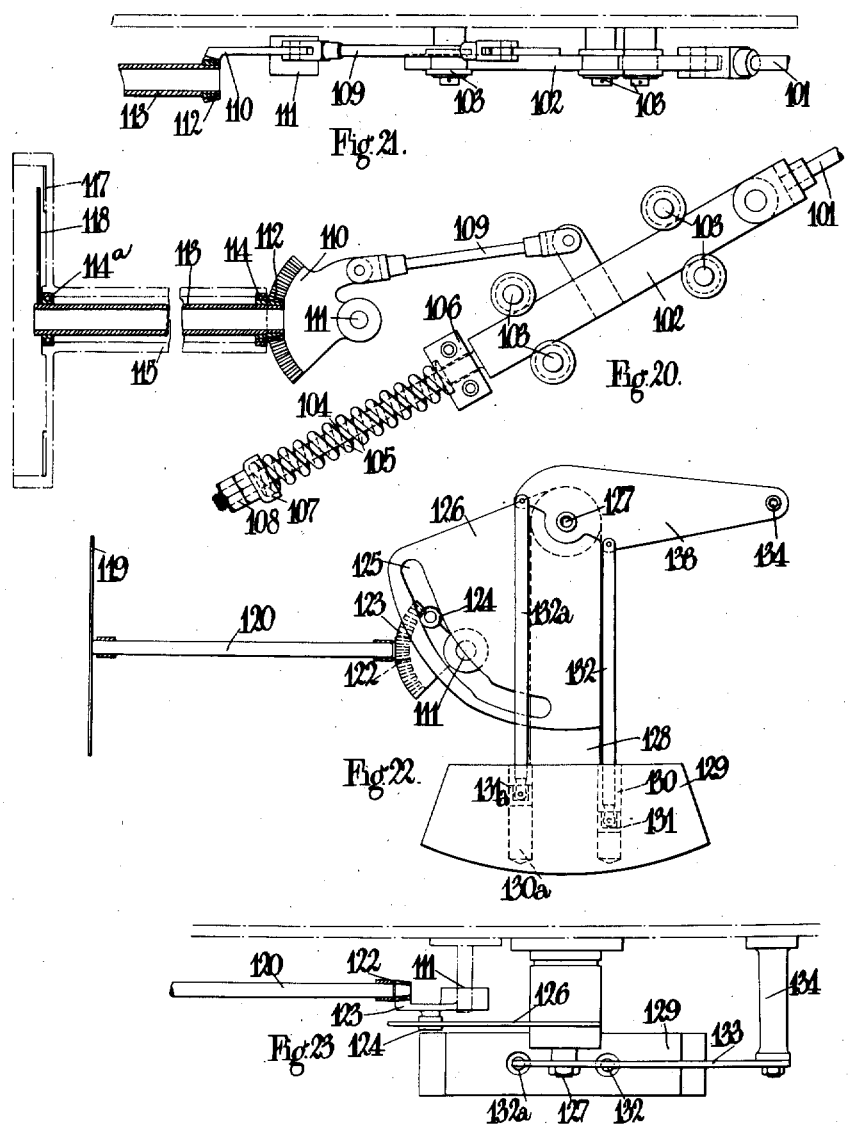

Feb. 11, 1936.  A. F. NASH  2,030,529
SAFETY DEVICE FOR CRANES AND THE LIKE
Filed Dec. 22, 1931   8 Sheets-Sheet 8
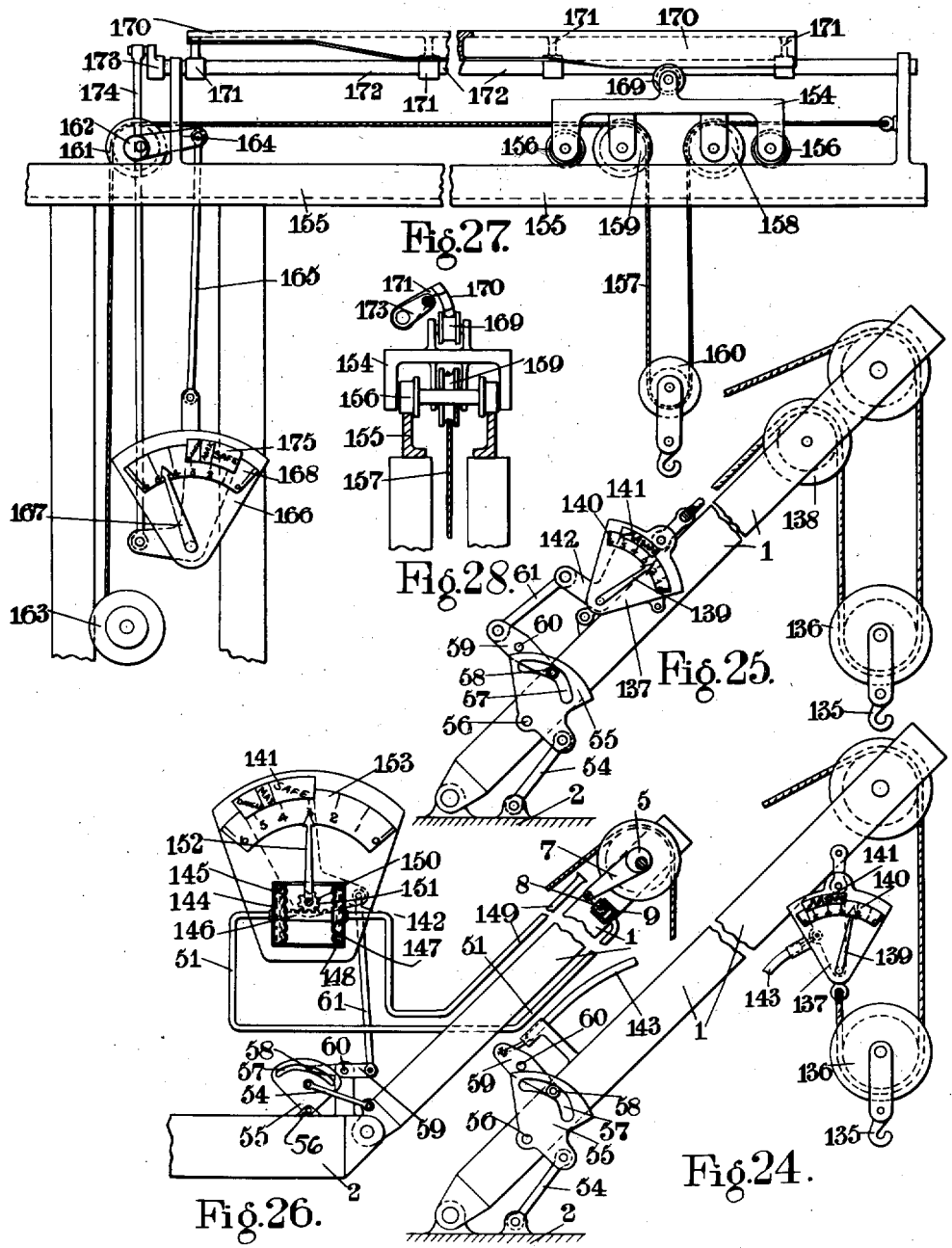
A. F. Nash
INVENTOR
By Marks & Clerk
Attys.

Patented Feb. 11, 1936

2,030,529

UNITED STATES PATENT OFFICE 2,030,529

SAFETY DEVICE FOR CRANES AND THE LIKE

Archibald Frazer Nash, Kingston Hill, England

Application December 22, 1931, Serial No. 582,666
In Great Britain December 29, 1930

3 Claims. (Cl. 116—114)

This invention relates to lifting devices and particularly to cranes, derricks, shear legs and the like lifting devices provided with luffing gear or otherwise with means adapted to provide a varying radius of lift and has for its object to provide improved means adapted to operate to ensure that the limits of safety of the device will not be exceeded as, for instance, by giving a visible, audible or other warning signal to the operator of the device with or without simultaneously actuating means for positively deferring or interrupting the operation of the lifting device when the safe load is exceeded.

According to the invention the safety means comprises two independently moving elements, one actuated by the magnitude of the load to be raised, the other actuated in accordance with the angle of inclination of the jib or its equivalent or otherwise in accordance with variations in the radius of lift, said elements being associated one with the other in such manner that the relation between the positions they are caused to assume will operate to indicate when the lifting device is overloaded and/or to indicate the relation between the magnitude of the load and the permissible limit of loading.

At this point it may be mentioned that the invention extends not only to cranes provided with jibs or the like, the inclination of which is adapted to be varied, but also to hammer-head and shipyard cranes and other lifting devices in which, for instance, the crane hook or its equivalent is arranged on a carriage adapted to travel on a cantilever or a similar structure.

Thus in accordance with the invention, an indicator adapted to be moved relatively to a scale in accordance with the angle of inclination of the jib or its equivalent or otherwise in accordance with variations in the radius of lift and which may directly indicate the magnitude of the angle is associated with a second indicator actuated solely or principally by the weight of the load being raised in such manner that the two indicators will cooperate in showing when the safe load is exceeded.

For instance, an indicator adapted to be moved in accordance with the variation of the angle of inclination of the jib or otherwise in accordance with variation in the radius of lift may be provided with an index cooperating with a scale and adjacent thereto and cooperating with the index there may be arranged a second indicator adapted to be influenced by the magnitude of the load in such manner as to cause a second scale, with divisions marked "Safe", "Maximum", and "Danger" to be moved relatively to the main scale and to the index.

Alternatively, the indicator adapted to be moved in accordance with the variation in the radius of lift may be provided with an index plate or scale having divisions marked "Safe", "Maximum" and "Danger" and with this indicator there may be associated a scale marked with divisions adapted to indicate the magnitude of the load being raised and adjacent to the first-mentioned indicator there may be arranged to co-operate with the scale a second indicator adapted to be moved over the scale in accordance with the magnitude of the load.

The invention will be described further in detail and by way of example with reference to the accompanying drawings, in which:—

Figure 1 is a view of one construction,

Figure 2 being a view of a detail thereof;

Figures 3, 4, 5, 6, 7, and 8 are fragmentary views illustrating various alternative means whereby the effect of the load on the burden rope or chain may be applied to a device for indicating the magnitude of the load such, for instance, as is illustrated in Figures 1 and 2;

Figure 9 illustrates an alternative construction in which the effect of the load is applied through the jib to hydraulic balancing means, Figures 10, 11, and 12 illustrate alternative hydraulic balancing means which may be employed;

Figures 13, 14, 15, and 16 illustrate further arrangements in which the effect of the load is applied to the base of the jib;

Figure 17 illustrates one application of the invention to a derrick;

Figure 20 is a dissected view in elevation showing certain elements of the construction illustrated in the preceding figures;

Figure 21 is a corresponding plan view;

Figure 22 is a view of certain other details which in Figure 18 are superimposed on the details shown in Figure 20, Figure 23 being a plan view corresponding with Figure 22.

Figure 13:
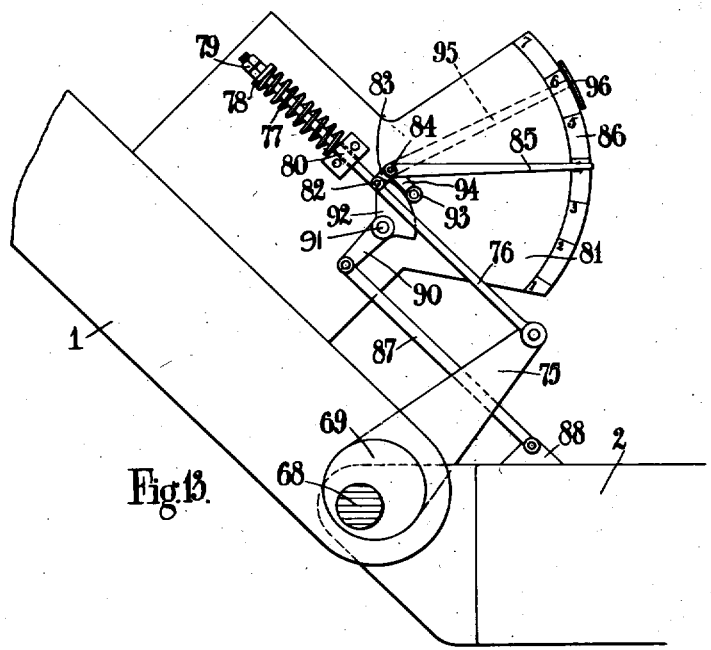

Figures 24, 25, and 26 illustrate three further constructions of jib crane in accordance with the invention, and Figures 27 and 28 are, respectively, a view in side elevation and a fragmentary view partly in section of a cantilever crane embodying the invention.

Referring to Figures 1, 3, 4, 5, 6, 7, 8, 9, 10, 11, 12, 13, 14, 15, 16, 17, 24, 25, and 26, I represents the jib which is pivotally secured, in the case of the constructions shown in Figures 1, 7, 8, 9, 10, 11, 12, 13, 14, 24, 25, and 26, to the base plate 2.

In Figures 1, 3, 4, 5, 6, 7, 8, 24, 25, and 26, 3 indicates the pulley at the head of the jib, while 4 indicates the burden rope.

In the case of the constructions illustrated in Figures 1 to 5 and 26, means is associated with the pulley itself adapted to be influenced by the magnitude of the load or the overturning moment due to the load and the angle of inclination of the crane.

For this purpose in the constructions illustrated by Figures 1, 3, and 26, the pulley is mounted on the sleeve 5 in turn eccentrically mounted on the pin 6 secured in the sides of the jib. With this sleeve is connected an arm 7 which, in the case of the construction illustrated in Figures 1 and 26, is connected with a piston 8 working in a chamber 9. In the case of the construction shown in Figure 3, the arm is connected by a link 10 with the flexible wall 11 of the chamber 12.

In the case of the constructions shown in Figures 4 and 5, the pulley is mounted in a bearing 13 which, in the case of the construction shown in Figure 4, is connected with a piston 14, slidably mounted in the chamber 15, while in the case of the construction shown in Figure 5 the bearing is connected with the flexible wall 16 of the chamber 17.

In the construction shown in Figure 6, the lifting rope or burden rope is taken over a second pulley 18 and under a third pulley 19 which is pivotally mounted in the lever 20, in turn pivotally mounted about the pin 21 secured to the jib of the crane and the end of the lever in question is connected by the rod 22 with a piston 23 working in a cylinder 24 while in the case of the construction shown in Figure 7 the drum 25 about which the rope or chain is wound is journalled in a sliding bearing 26 connected by the rod 27 with the piston 28 working in the chamber 29.

In the construction shown in Figure 8, one end of the burden rope is connected with the lever 30 pivoted at 31 and connected by the rod or link 32 with the piston 33 slidable within the chamber 34.

In the case of the constructions illustrated by Figures 9, 10, 11, and 12, as has been explained, the effect of the load is applied through the jib of the safety device and in the case of the construction illustrated in Figure 9, the end of the jib forms a piston 35 working in the chamber 36 pivotally connected by the pin 37 with the base of the crane.

In the construction shown in Figure 10, the jib is pivotally connected by the pin 38 with a piston 39 operating in the chamber 40 while in the case of the construction illustrated in Figure 11, in the length of the jib there is interposed a flexible walled chamber 41, while in the case of the construction illustrated in Figure 12, a similarly formed chamber 42 is arranged in the block 43 which forms a pivotal mounting for the jib.

In the case of the derrick illustrated in Figure 17, the post 44 of the derrick is pivotally connected by the pin 45 with the base plate 46 mounted in known manner on the foot-step 47 and the post 44 is connected by the rod 48 with the piston 49 working in the chamber 50.

In all of the constructions above described the chamber in which the piston is mounted or, alternatively, what is its equivalent, the flexible walled chamber, is filled with liquid and is connected by a flexible pipe 51 with a piston or diaphragm device of known character adapted to move an index needle 52 over a scale such as 53 in accordance with the magnitude of the pressure within the pipe.

With all of the constructions above described there is also associated means, although for convenience it has been omitted from certain of the figures, adapted to be actuated in accordance with the variation in the angle of inclination of the jib. The character of this means is clearly shown in Figures 1, 8, 9, and 17, and it comprises a link 54 connected with the foot of the jib and with a plate 55 pivotally mounted on the pin 56 and provided with a cam slot 57 in which operates a roller 58 connected with a lever 59 pivoted on the pin 60 secured to some fixed point, the lever being in turn connected, through the link 61, with a toothed bevel sector 62 rotatable about the pivot 63. This toothed sector is in engagement with a toothed bevel wheel 64 mounted on the shaft 65 and connected with the member 66 carrying the indicator 67 marked into divisions inscribed "Safe", "Max." and "Danger".

As will be appreciated in the above constructions the load which is being raised will operate to move the index 52 over the scale which may indicate the dead weight of the load or, alternatively, indicate the magnitude of the overturning moment, while variation in the angle of inclination of the jib will cause the cam plate 55 to be moved thus moving the lever 59 about its pivot and thereby causing corresponding motion of the toothed bevel sector 62 which, in consequence of its engagement with the toothed bevel wheel 64 will in turn impart motion to the member 67.

The cam slot will be formed so as to impart appropriate motion to the member 67 in accordance with the variation in the angle of inclination of the jib so as to ensure that in all positions of the jib by co-operation of the index 52 with the scale 67, the device will indicate whether the lifting device is being worked within the limits of safety taking into account the various factors such as the crushing strength of the jib and the stresses set up in the various portions of the crane or the like whether the maximum load for a particular angle of inclination is being raised or whether this maximum load is exceeded.

Figure 14:
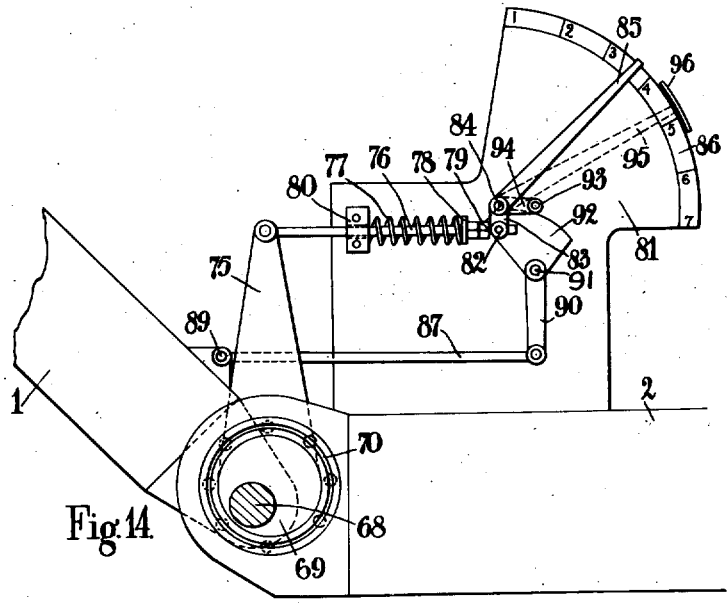

In the case of the constructions illustrated in Figures 13 and 14, the jib is mounted upon a pin 68 in the eccentric 69 which, as shown in Figure 14, is mounted in ball bearings 70.

In the construction illustrated in Figure 16, the post 44 is associated with an eccentric, which is journalled in the collar 71 in the link 72 connected by the pin 73 with the bracket 74 extending from the base plate 46.

In each of these constructions the eccentric is provided with an arm 75 connected with the rod 76 about which is arranged in compression, the spring 77 one end of which bears on a washer 78 secured in position on the rod by nuts 79, the other end of the spring bearing against an abutment 80 provided on the plate 81 which, in the case of the construction illustrated in Figure 13, is connected with the jib while in the construction illustrated in Figure 14, the plate in question is connected with the base plate of the crane and in the case of the construction illustrated in Figure 16 with the post 44.

In these constructions, the rod 76 is connected by the pin 82 with the arm 83 pivotally mounted on the pin 84, the other arm 85 of the lever forming an index co-operating with the scale 86.

The load transmitted through the jib with this construction causes the arm 85 of the lever to move over the scale. In addition, variation in the angle of inclination of the jib will cause the link 87 to move, one end of which is connected, in the case of the construction shown in Figure 13, with the lug 88 on the base plate of the crane or, in the case of the constructions shown in Figures 14 and 16 with a lug 89 on the jib itself. The other end of the link in question is connected with one end of the lever 90 mounted on the pin 91, while the other end of the lever is formed as a cam 92 with which is arranged to co-operate a roller 93 provided on the arm 94 of a bell crank lever. The other arm 95 of the bell crank lever is extended and is provided with a plate 96 which is marked "Safe", "Maximum" and "Danger", to move this plate relatively to the scale and also relatively to the arm 85.

In Figure 15, which illustrates a construction resembling in certain respects the construction illustrated in Figures 13 and 14, like references indicate like parts. In this construction, however, the rod 76 is connected to one arm of the bell crank lever 97 pivoted on the pin 98, the other arm of this lever being connected with the guy rope 99.

Figures 18, 19:
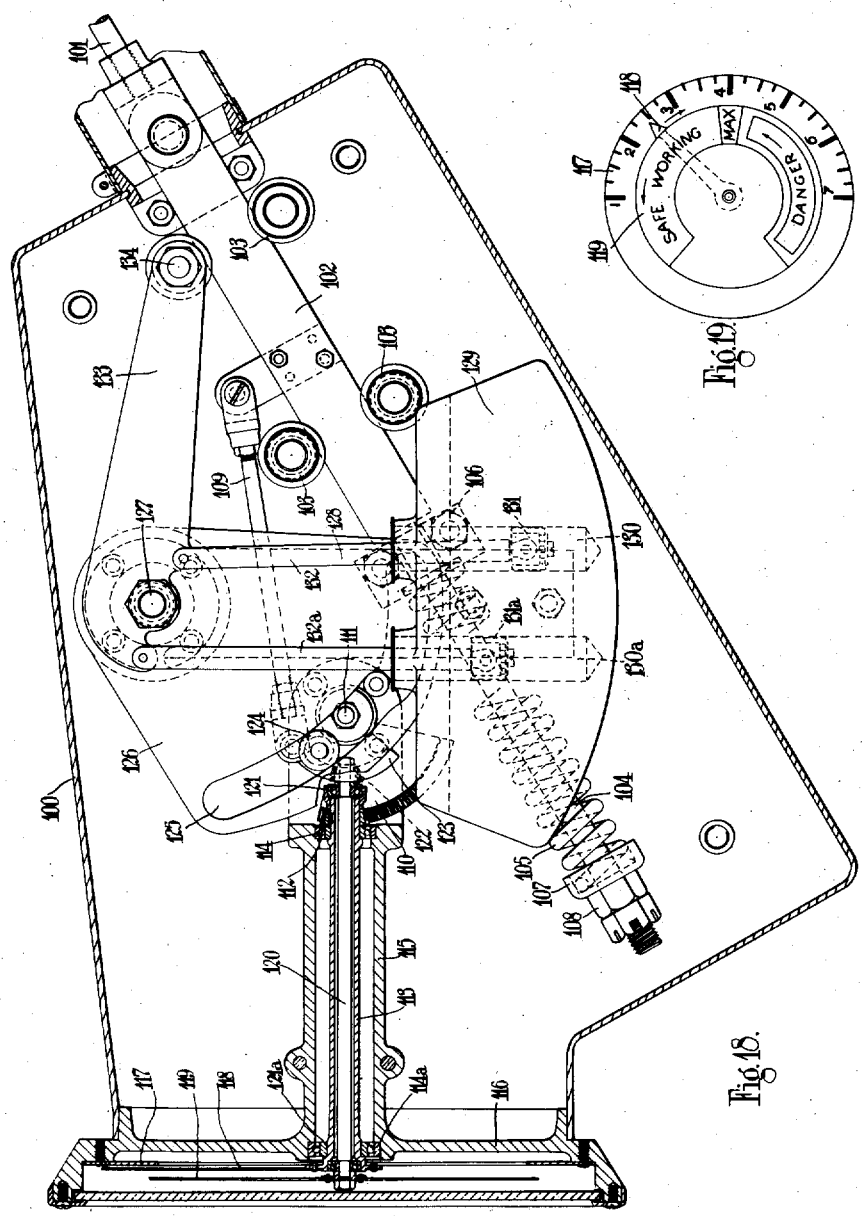
Figure 18 is a view in elevation and partly in section of another construction adapted more particularly for application to luffing cranes.
Figure 19 is a view in front elevation showing the indicator dial thereof.

Referring to Figures 18 to 23, in Figure 18, 100 is a casing housing the essential mechanism of the safety device. In this construction some member subjected to the action of the load, for instance, an eccentric on which the pulley at the head of the jib is mounted, is connected by a rod 101 with the member 102 slidably mounted between guide rollers 103.

About an extension 104 of this member there is arranged a spring 105, one end of which bears against the fixed abutment 106, while the other bears against the cupped washer 107 secured in position by the nuts 108. The member 102 is connected by the link 109 with the toothed sector 110 which is pivoted on the pin 111 and this toothed sector is in engagement with the bevel wheel 112 secured to a tubular shaft 113 mounted in bearings 114, 114a, in the sleeve 115 which forms an extension of a circular closure 116 for the casing. The circular closure forms part of the housing for the indicating mechanism which comprises a dial 117 with which co-operates the index 118 secured to the tubular shaft 113. With the dial also co-operates a disc 119 marked as shown in Figure 19 into divisions bearing such inscriptions as "Safe working", "Maximum" and "Danger". This disc is connected to the shaft 120 rotatably mounted in bearings 121 and 121a. On the shaft 120 there is secured a bevel wheel 122 which meshes with a toothed sector 123 pivotally mounted on the pin 111 and provided with a roller 124 engaged in the cam slot 125 of the sector 126 which is pivoted on the pin 127 and is rigidly connected with the pendulum 128, the bob 129 of which is provided with recesses 130 and 130a in which work pistons 131 and 131a connected by the rods 132 and 132a with the plate 133 rigidly connected to the post 134 and to the pin 127.

The pistons 131 and 131a operating in the recesses which are filled with oil function as dampers.

With this construction, as will be understood, the index 118 is moved solely under the influence of the load and it will co-operate with the outer scale to indicate the magnitude of the load at all times, while the casing being fixed to the jib of the crane in consequence of variation in the angle of inclination of the jib will be caused to be moved relatively to the pendulum which will, obviously, be constrained to retain the vertical position. In this way, the position of the roller 124 in the cam slot 125 will be varied and as a result of the variation in its position due to the constraining action of the pendulum, the sector 123 will be rotated and will in turn rotate the bevel wheel 122 and the shaft 120 and the disc 119 relatively to the scale in such manner that as the inclination of the jib of the crane approaches the horizontal, the marking "Maximum" thereon will approach more nearly to the numeral 1, assuming that the scale is marked as indicated in Figure 19.

The load hook 135 is, in the case of the constructions illustrated in Figures 24 and 25, mounted upon a snatch block 136 and one end of the burden rope is, in these constructions connected to a dynamometer weighing device indicated generally by the reference 137 which, in the case of the construction illustrated in Figure 24, is arranged adjacent to the jib head while in the case of the construction illustrated in Figure 25, the dynamometer device is arranged at the base of the jib, the rope being, in this construction, led over a second pulley 138 adjacent to the jib head and then down to the dynamometer device.

In both of these constructions the indicator element 139, which is mainly influenced by variation in the magnitude of the load, co-operates with the main scale 140 and with this scale there is associated a second indicator element 141 which is moved relatively to the main scale by variation in the radius of lift. This indicator element corresponds in function with the indicator element 67, in the construction shown in Figure 1, or the indicator element 96, in the constructions shown in Figures 13 to 16, and it is actuated by variation in the angle of inclination of the jib, as in the case of the construction shown in Figure 1, through the intermediary of a link 54 connecting the foot of the jib with the plate 55 pivotally mounted on the pin 56 and provided with a cam slot 57 in which operates a roller 58 connected with a lever 59 pivoted on the pin 60 secured to some fixed point on the base plate 2 of the crane, the lever 59 being connected by the link 61 with the extension 142 of the second indicator element 141 which is co-axially mounted with the indicator element 139.

In the case of the construction illustrated in Figure 24, motion is transmitted to the indicator element 141 from the lever 59 through a flexible wire mechanism 143 commonly called a Bowden wire mechanism.

The arrangement illustrated in Figure 26 is more particularly adapted for cranes having a long jib and in this case the thrust from the eccentric sleeve 5 is transmitted through the lever 7 to the ram 8 operating in the cylinder 9 from which a pipe line 51 extends to a cylinder 144 provided with a flexible diaphragm 145 connected to one end of a rack 146, the other end of the rack being connected with the flexible diaphragm 147 provided on the cylinder 148 from which extends a second pipe line 149 in which the fluid is not subjected to pressure due to load, the pipe lines 51 and 149 running parallel. The rack 146 co-operates with a pinion 150 on the spindle 151 of the indicator element 152 which moves over the scale 153 and with this scale there is arranged to co-operate, as in the previously described constructions, a second indicator element 141 which is co-axially mounted with the pinion in question. Motion of this indicator element relatively to the scale is, as in the case of the construction illustrated in Figures 24 and 25, effected through the intermediary of a link 54 connecting the foot of the jib with the plate 55 pivotally mounted on the pin 56 and provided with a cam slot 57 in which operates a roller 58 connected with a lever 59 pivoted on the pin 60 secured to some fixed point on the base plate 2 of the crane, the lever 59 being connected by the link 61 with the extension 142 of the second indicator element 141.

Referring to Figure 27 in which a crane of the hammer head or cantilever type is illustrated, the carriage 154 is arranged to travel along the cantilever 155, the carriage being provided with wheels 156 and in this construction the burden rope 157 is carried over pulleys 158, 159, a snatch block 160 being arranged in the bight of the rope between these pulleys and continued over the pulley 161 which is mounted upon an eccentric sleeve 162, the rope extending to the winding drum 163. The eccentric sleeve 162 is connected with the lever 164 which, in turn, is connected through the rod 165 with the dynamometer device 166 in such manner that the indicator element 167 will be moved over the main scale 168 by variation in the magnitude of the load raised.

On the carriage 154 there is provided also a grooved wheel 169 engaging the edge of the spiral formed blade 170 which is connected by arms 171 to the shaft 172 on the end of which is provided a crank 173 connected by the rod 174 with a second indicator element 175.

With this construction, as will be appreciated motion of the carriage along the cantilever will cause rotation of the shaft 172 which, in turn, will cause motion to be imparted to the indicator element 175 moving the same over the scale 168 in accordance with variation in the radius of lift.

I claim:

1. A safe load indicator for a lifting device of the kind having a member to which motion is imparted for varying the radius of lift, comprising a scale bearing member marked with graduations indicating load magnitudes, an indicator element in the form of a scale marked with indications "Safe", "Maximum" and "Danger", a cam pivotally mounted on the lifting device, a connection between the member to which motion is imparted for varying the radius of lift and the cam whereby by such variation motion will be imparted to the cam, a connection between the cam and the indicator element in the form of a scale marked with indications "Safe", "Maximum" and "Danger" adapted to move the said indicator element relatively to the scale bearing member in accordance with variation in the radius of lift, an indicator element in the form of a pointer, a weight sensitive device and an operative connection between said weight sensitive device and the pointer adapted to move the pointer relatively to the scale bearing member in accordance with variations in the magnitude of the load being raised.

2. A safe load indicator for a lifting device of the kind having a member to which motion is imparted for varying the radius of lift, comprising a scale bearing member marked with graduations indicating load magnitudes, an indicator element in the form of a scale marked with indications "Safe", "Maximum" and "Danger", a cam pivotally mounted on the lifting device, a connection between the member to which motion is imparted for varying the radius of lift and the cam whereby by such variation motion will be imparted to the cam, a connection between the cam and the indicator element in the form of a scale marked with indications "Safe", "Maximum" and "Danger" adapted to move the said indicator element relatively to the scale bearing member in accordance with variation in the radius of lift, an indicator element in the form of a pointer, means for moving the pointer relatively to the scale bearing member in accordance with variations in the magnitude of the load being raised, said means including a pulley, a flexible member pasing over said pulley and subjected to tension by the load, an eccentric mounting for the pulley, stress receiving means associated with the eccentric mounting and means adapted to move the pointer relatively to the scale in accordance with stresses set up in the stress receiving means by the load.

3. A safe load indicator for a lifting device having a varying radius of lift comprising a pivotally mounted indicator element in the form of a scale marked with indications "Safe", "Maximum" and "Danger", cam-operated means adapted to move the said indicator element about its pivotal mounting in accordance with variations in radius of lift and an indicator element in the form of a pointer pivotally mounted coaxially with respect to the first-mentioned indicator element, a weight sensitive device and an operative connection between said weight sensitive device and the indicator element in the form of a pointer adapted to move the same about its pivotal mounting relatively to the indicator element in the form of a scale.

ARCHIBALD FRAZER NASH.